US008573564B2

(12) United States Patent
Rashall

(10) Patent No.: US 8,573,564 B2
(45) Date of Patent: Nov. 5, 2013

(54) LIFTING SYSTEM AND METHOD FOR LIFTING BULK SIZED, HIGH WEIGHT OBJECTS

(76) Inventor: Richard J. Rashall, Beaumont, TX (US)

( * ) Notice: Subject to any disclaimer, the term of this patent is extended or adjusted under 35 U.S.C. 154(b) by 535 days.

(21) Appl. No.: 12/657,828

(22) Filed: Jan. 28, 2010

(65) Prior Publication Data

US 2011/0164956 A1 Jul. 7, 2011

Related U.S. Application Data

(60) Provisional application No. 61/335,375, filed on Jan. 6, 2010.

(51) Int. Cl.
*B60S 9/02* (2006.01)

(52) U.S. Cl.
USPC ............................ 254/418; 254/419; 254/425

(58) Field of Classification Search
USPC ................................ 254/418, 419–425, 93 L
See application file for complete search history.

(56) References Cited

U.S. PATENT DOCUMENTS

| | | | | |
|---|---|---|---|---|
| 5,188,379 | A * | 2/1993 | Krause et al. | 254/423 |
| 6,923,599 | B2 * | 8/2005 | Kelso | 405/230 |
| 2001/0004109 | A1 * | 6/2001 | Belley et al. | 254/89 H |
| 2008/0164449 | A1 * | 7/2008 | Gray et al. | 254/93 R |
| 2009/0026430 | A1 * | 1/2009 | McDonald et al. | 254/93 R |
| 2009/0280010 | A1 * | 11/2009 | Pederson | 416/1 |
| 2011/0164956 | A1 * | 7/2011 | Rashall | 414/809 |

* cited by examiner

*Primary Examiner* — Lee D Wilson
(74) *Attorney, Agent, or Firm* — Beirne, Maynard & Parsons, L.L.P.; William C. Norvell, Jr.

(57) ABSTRACT

A lifting system and method are disclosed for lifting bulk sized, extremely high weight objects, such as a house, other buildings, skids, chemical plant modules, refinery modules or storage facility, or the like, from one position to another position. The system includes at least one cylinder housing a respective hydraulically actuated, telescoping piston. A lifting plate having an upper face is in operable communication with the piston and is further horizontally offset from the respective piston whereby, when the lifting system is positioned for lifting the high weight object, each of the upper faces may be positioned in close proximity to the ground and under the high weight object at the lifting points, without positioning any of the pistons under the high weight object. A method of operation is also disclosed.

4 Claims, 10 Drawing Sheets

401

100
202
204
5
5
4
4
301
302
300

100
302
300

100
302
300
301

LIFTING SYSTEM AND METHOD FOR LIFTING BULK SIZED, HIGH WEIGHT OBJECTS

CROSS REFERENCE TO RELATED APPLICATION

This application is a utility application and claims priority to provisional patent application No. 61/335,375 filed on Jan. 6, 2010.

BACKGROUND OF THE INVENTION (1) Field of the Invention

The invention is directed to a system and method for lifting, or elevating, bulk-sized, heavy weight objects, such as buildings, skids, chemical plant modules, refinery modules, storage facilities, and the like.

(2) Brief Description of the Prior Art

Bulk sized, or extremely high weight objects include power generator stations, pre-fabricated and other buildings, water and sewage treatment facilities, chemical plant modules, refinery modules, and the like. These objects may be several stories high and/or weigh tens, or even hundreds of tons. Most, but not all, of these facilities are built to be used at one location for a specified amount of time, and then transported, either by barge, ship, truck, rail to another, often remote, location. Some of these objects are fabricated on or of metal or other frameworks, to better enable transportation from one location to another. Most of these facilities or objects are designed to be placed very close to or on cement, asphalt or other surfaces at or near ground level. Some of these facilities or objects are also positioned on a foundation of cinder blocks or concrete bases spaced intermittently or solidly under the facility or at corners, such that the facility rests very close to ground level. As used herein, “bulk-sized or extremely high weight objects” refers to such constructions.

When it is desired to move such a facility or object from one location to another, the facility must be raised above the ground a certain height in order to enable a truck trailer or other transport device to be moved under the facility. Thereafter, the facility is lowered, slowly, onto the transport device or trailer framework and is then transported intact to the desired location. Typically, conventional jacks, designed to raise large or heavy objects are used. A number of these jacks are typically placed around the lower framework or body of the object, as well at the corners thereof. These conventional jacks are hydraulically actuated and have a plate or other body at the top or distal end of the piston which is selectively placed in position under the object to be moved. Because the telescoping expansion stroke of the piston is comparatively short, and certainly shorter than the required distance or height required to raise the object in order to move the transporting equipment or machinery under it, these piston jacks must first be activated to the maximum expanded position, then large, concrete, wood or similar blocks are placed under the object. Thereafter, similar concrete or similar blocks are stacked below the object or facility to be moved, and the piston jacks retracted and placed on these stacks. This procedure is then repeated until the facility or object is raised a sufficient height to enable the transport equipment or vehicle to be moved under the object. The object is then lowered onto the transporting vehicle or device by telescopically contracting the piston of the jacks to slowly, and carefully, place the object on the bed or similar means of the vehicle or transport device or mechanism.

The total height or distance required to lift these object from their location on or near ground level to the height required to enable the transporting equipment to be positioned under the object may be from about four feet to as much as about six feet.

These piston jack assemblies typically are hydraulically controlled so that they are in concert in raising the object such that the object constantly remains in one horizontal plane as it is raised vertically. Alternatively, but not preferably, these piston jacks may be operated manually, and separately.

As will be appreciated, this technique is not only cumbersome, but is time consuming, and slow. This technique also may require considerable man power in placing and operating the piston jacks, as well as the placement and removal of the stacks of cylinder or cement or wood blocks.

The present invention is directed at remedying many of the disadvantages of this and similar techniques.

SUMMARY OF THE INVENTION

The invention provides a hydraulically actuated lifting system for raising a bulk sized, extremely high weight object from one position in close proximity to the ground to another, elevated position. The object will have having at least one lifting point in close proximity to the ground. The lifting system comprises at least one base. A cylindrical member is disposed on each base. A normally retracted, selectively hydraulically telescopically extendable piston member is provided within each cylindrical member. The piston member has a distal end and a dorsal end. Lifting plate means include an upper face, and the lifting plate means is responsive to telescopically extending movements of the respective piston member. The lifting plate means is designed such that it is horizontally off-set from the respective piston member, whereby, when the lifting system is positioned for lifting the high weight object, the respective upper face may be positioned in close proximity to the ground and under the high weight object at a lifting point, without positioning any of the respective piston members under the high weight object.

In operation, the system is positioned with each piston assembly placed such the lifting plate is under the lifting point(s) of the object to be raised. Hydraulic conduit lines are sealingly connected to the piston assembly at one end and to a control panel having a source of hydraulic fluid in communication therewith. Thereafter, pressure is increased in the hydraulic conduit lines by signal from the hydraulic control panel and the piston assembly is telescopically expanded and the object lifted a comparative distance to the required height to enable the transport mechanism or trailer to be moved under the object. A signal from the control panel is then initiated and the hydraulic fluid pressure reduced to enable the hydraulic fluid flow to be reversed from the piston assembly to a source or body of control fluid such that the piston is enabled to telescopically contract relative to the respective cylindrical housing a short distance. The object now is safely and completely resting on the transport mechanism or vehicle and may be moved from the initial location to another location.

It will be appreciated that one or more piston assemblies may be provided and that, if so provided, they preferably are operated in concert or in tandem to assure stabilization of the object as it is being elevated for transport.

It will also be appreciated that the system may be used simply to raise one side, or part, of an object, to enable repair of underlying pipes, electrical equipment or even the framework or foundation of the object, and thereafter set back down to its original location. One or more piston means or assemblies may be used in such an operation. A reference in the specification and the claims to "transport" of an object is intended to also include raising and lowering the object, as opposed to movement from one location to another location.

DESCRIPTION OF THE PREFERRED EMBODIMENTS

Figures 1, 2, 3, 4, 5:
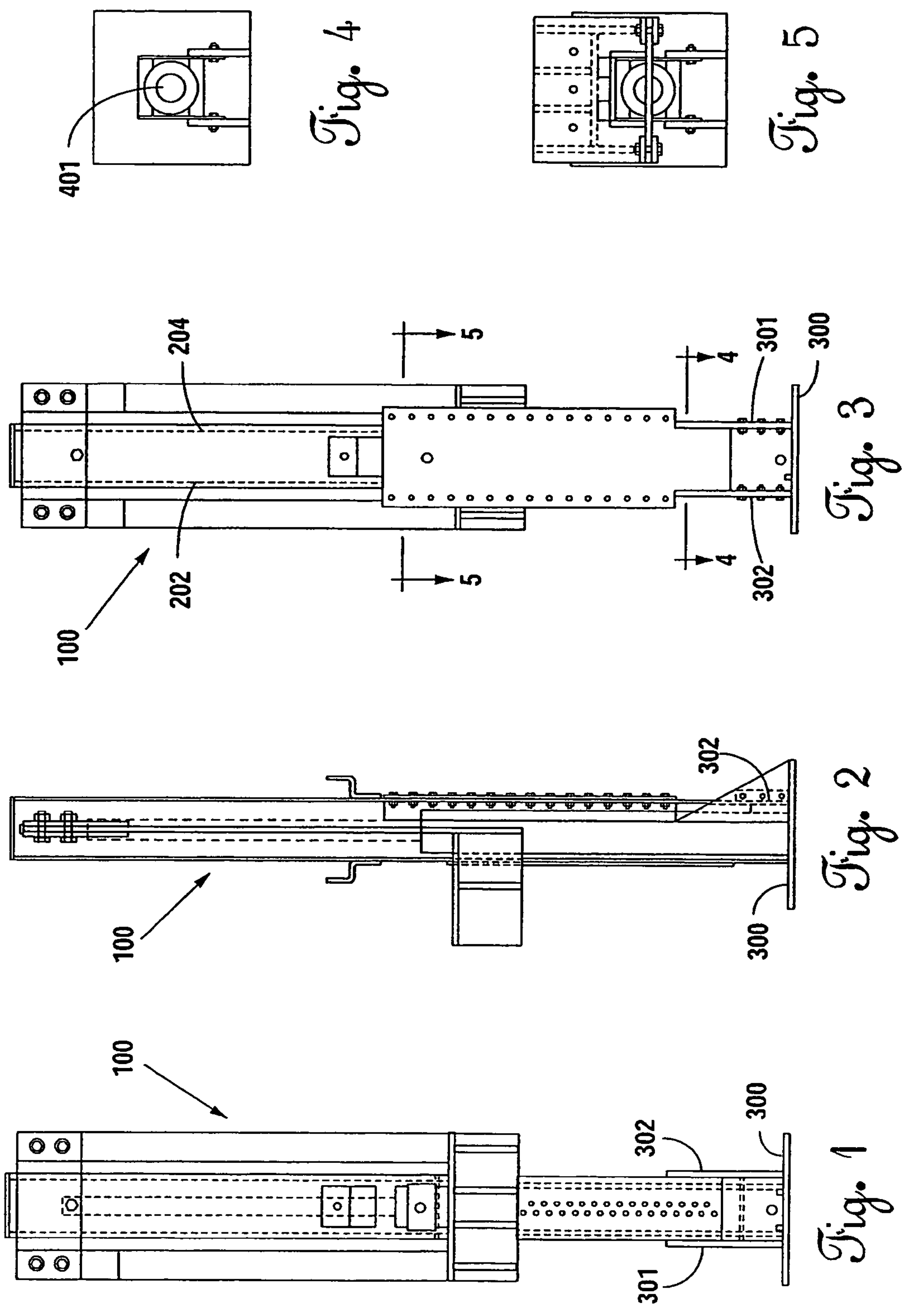
FIG. 1, is a schematic elevational and frontal view of the lifting assembly of the present invention, (without hydraulic hoses or control panel components).
FIG. 2, is a view similar to that of FIG. 1, as viewed from one side of the assembly.
FIG. 3 is a view similar to that of FIGS. 1 and 2, but as viewed from the back of the assembly.
FIG. 4, is a view taken along line 4-4 of FIG. 3 and looking downwardly, of the piston distal end of the assembly of FIGS. 1, 2, and 3.
FIG. 5, is a view taken along line 5-5 of FIG. 3, looking downwardly, and including the upper face of the off-set platform.
Figure 8:
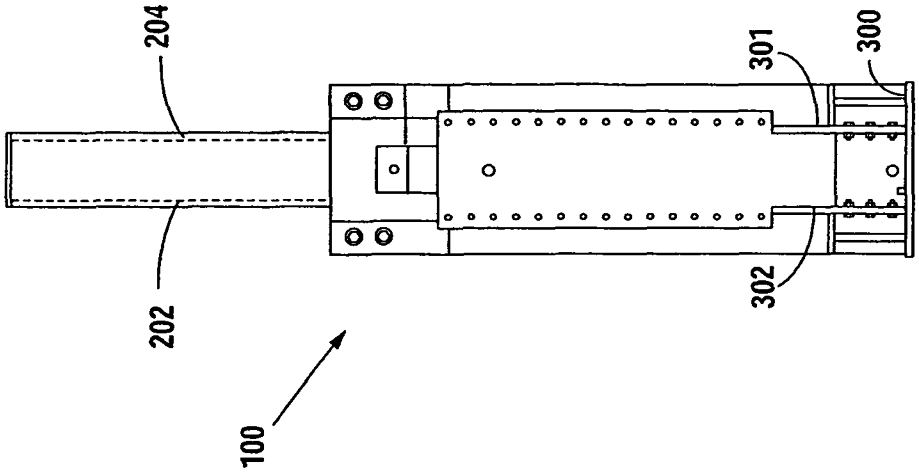
FIGS. 6, 7, and 8 are views similar to those of FIGS. 1, 2, and 3, respectively, illustrating the assembly in the initial, or retracted, position.
Figure 7:
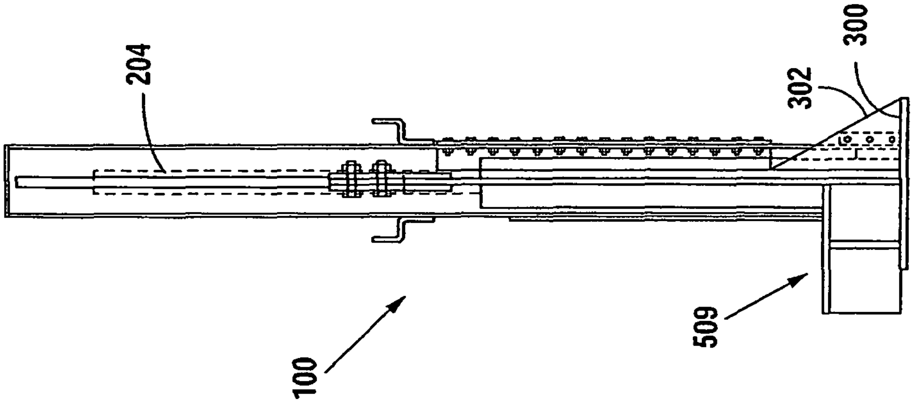
Figure 6:
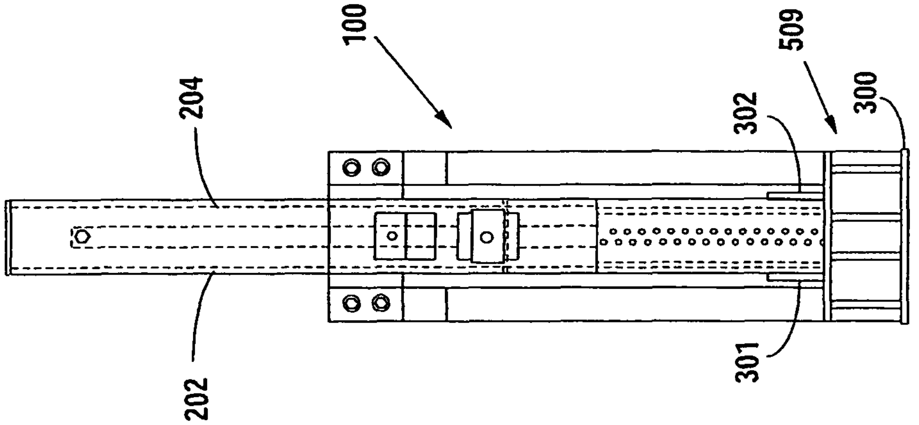
Figure 9:
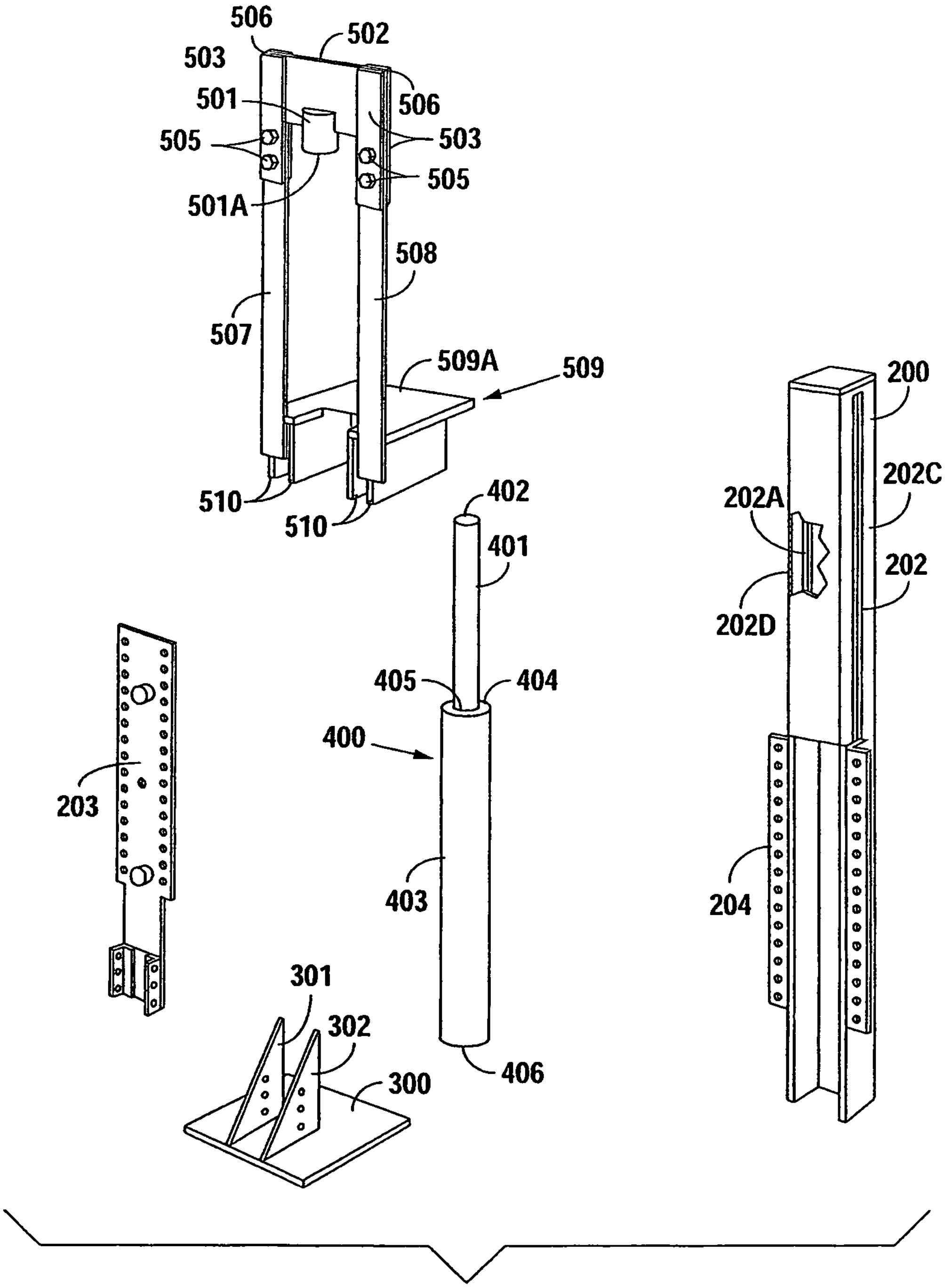
FIG. 9, is a schematic break-away illustration of the general component parts of the piston means and housing.
Figure 10:
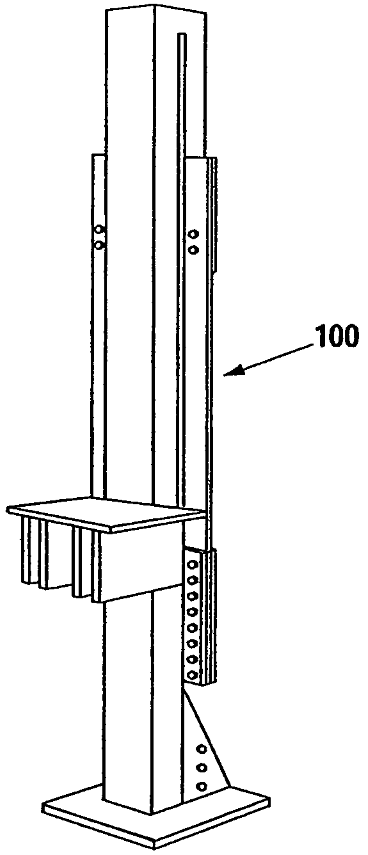
FIG. 10 is a view of the general components of FIG. 9, and in assembled position.
Figure 11:
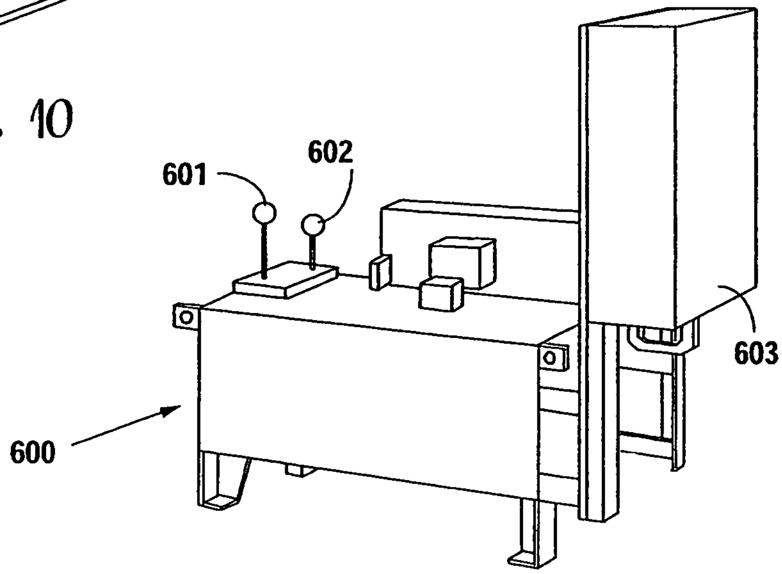
FIG. 11 is a schematic view of a hydraulic control panel for use in the present invention.

Now with first reference to FIGS. 9, 10 and 11, the system 100 of the present invention comprises a carriage assembly 500, a housing 200, a piston assembly 400, and a base 300. A control panel 600 (FIG. 11) includes hydraulic controls 601 and 602 for control of pressure in hydraulic lines or conduits 604, 608 (FIG. 15) having respective threaded and sealing ends 607 for connection to receiving ports or connectors on a control box 603 (FIG. 11). The hydraulic conduits 604, 608, are of known construction and commercially available from a number of sources. Likewise, the control panel 600 is of general and known construction and is also commercially available from a number of sources. For example, such components are readily available from ENERPAC, Inc. (web site: www.enerpac.com), as the "SLS-Series, Synchronous Lift" System. This hydraulic system can provide and accommodate from 1 ton to 100 tons of lift force per lifting point.

Figure 12:
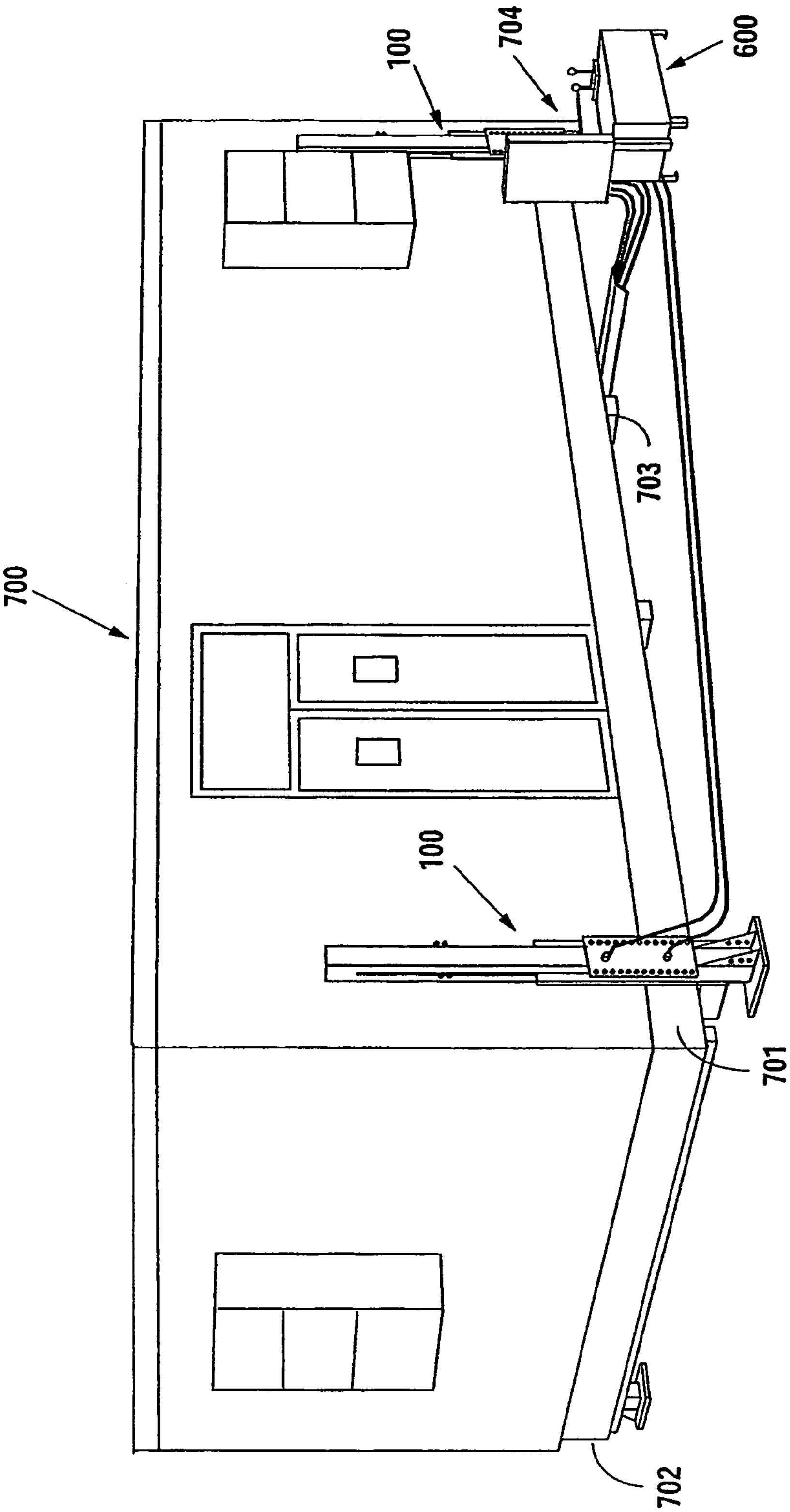
FIG. 12 is a schematic illustration of the system of the present invention in place over a bulk-sized high weight modular building, prior to activation of the system for lifting of the object.

Now referring to FIGS. 1 through 9, and, particularly, to FIG. 9, the system of the present invention also includes a base 300, having rectangularly extending side supports 301 and 302 which have a face bolted or welded or otherwise permanently secured to the base 300. In operation, the base 300 is positioned on the ground (see FIG. 12) adjacent a lifting point 701, 702, 703 and 704, of, for example, a modular building or other structure 700 (FIG. 12).

The system further comprises a piston assembly 400, having a piston head 401 with a flat, smooth circular piston head distal end 402. The piston head 401 selectively slides upwardly and downwardly within a cylinder 403 through a central opening 405 at the distal end of the cylinder 403, corresponding to the outer diameter of the piston head 401. The dorsal end 406 of the elongated cylinder 403 is secured, by bolting and/or welding same to the base 300, between the rectangular supports 301 and 302.

A carriage assembly 500 is provided for responsive lateral movements by the telescoping expansion or contraction of the piston head 401 relative to the cylinder 403. The carriage assembly 500 has at its uppermost end an armature plate 502 which is inserted within respective slots 506 and 507 of first and second arm supports 503 and 504. The supports 503 and 504 are likewise bolted and/or welded to companion, lowerly vertically extending elongated carriage arms 507 and 508. A square or rectangular lifting plate 509 is secured to side frames 509 and 510. The lifting plate 509 and frames 509 and 510 are secured by welding, and or bolts, to the lowermost ends of the respective carriage arms 507 and 508. The actual vertical height of the lifting plate 509 on the frames 510 and 509 is nominal, such as no more than 4 to 11 inches, or so, in order to assure that the plate 509 may be placed under the lifting point 701-704 of the object to be lifted.

The carriage assembly 500 is operably secured to the piston assembly 400 by placing the piston distal end 402 into the opening 501A of a piston cap 501 centered on the armature plate 502 between the carriage arms 507 and 508.

The piston assembly 400 and the carriage assembly 500 are housed within a slotted housing 200 having slots 202A and 202B in respective side walls 202C and 202D, such that a portion of each carriage arm 507 and 508 protrude outside of the respective slots 202A and 202B so that the operator may visually confirm the position of the carriage assembly and the lifting plate 509 relative to the piston assembly and the object to be lifted. A back panel 203 is secured to a panel anchor 204 after assembling the piston assembly 400 and the carriage assembly 500 therein. The completely assembled combination illustrated in FIG. 9, is shown in FIG. 10 (subsequent to the lifting plate 509 being elevated from the retracted or ground position to a position whereby the object to be lifted is also correspondingly elevated).

Figure 14:
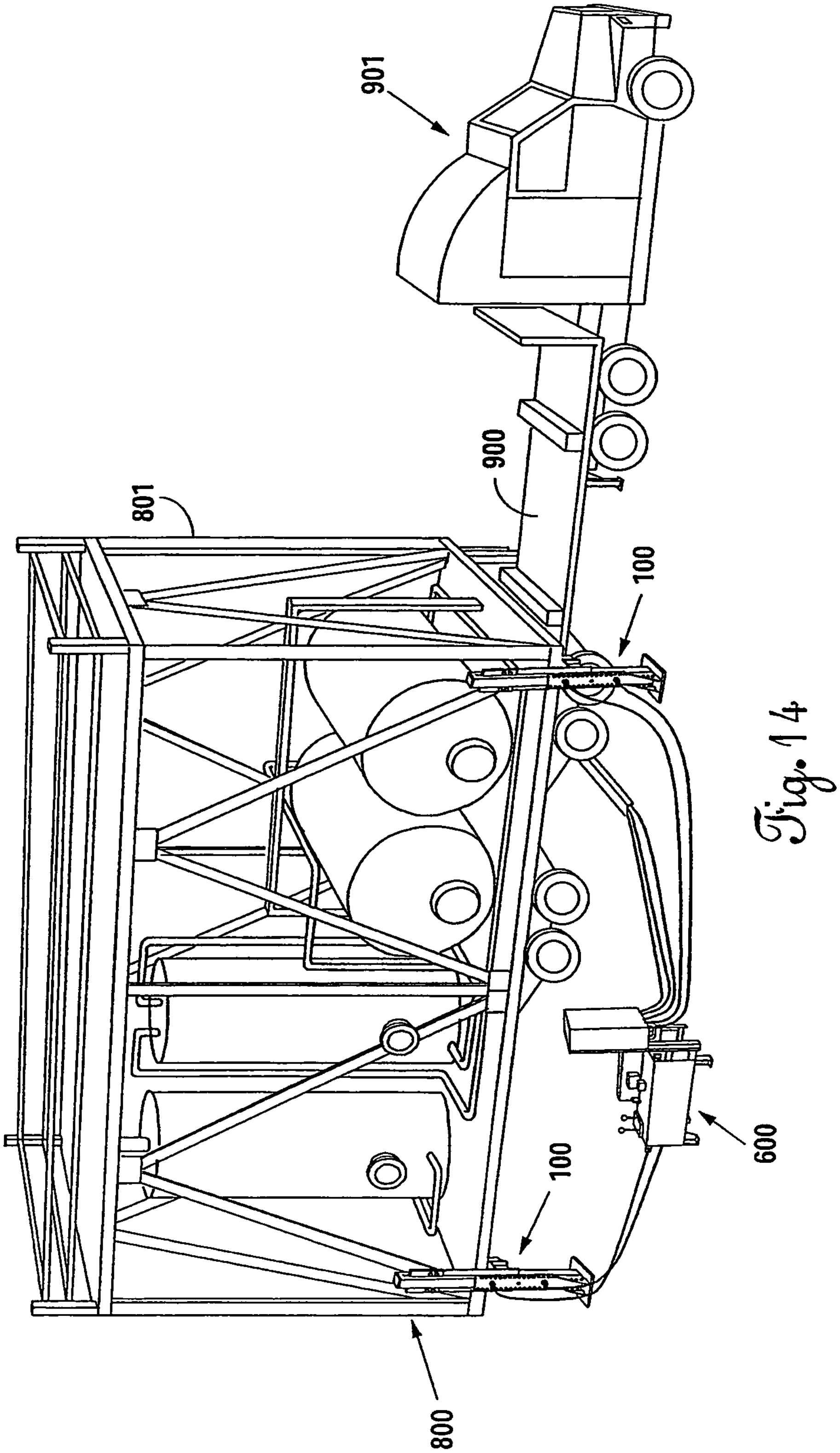
FIG. 14 is a view of the system positioned in place with the piston assemblies in place at lifting points for a chemical plant or refinery module, and subsequent to the system being activated to a level to permit a transporting vehicle to be placed under the elevated object for subsequent transport.
Figure 16:
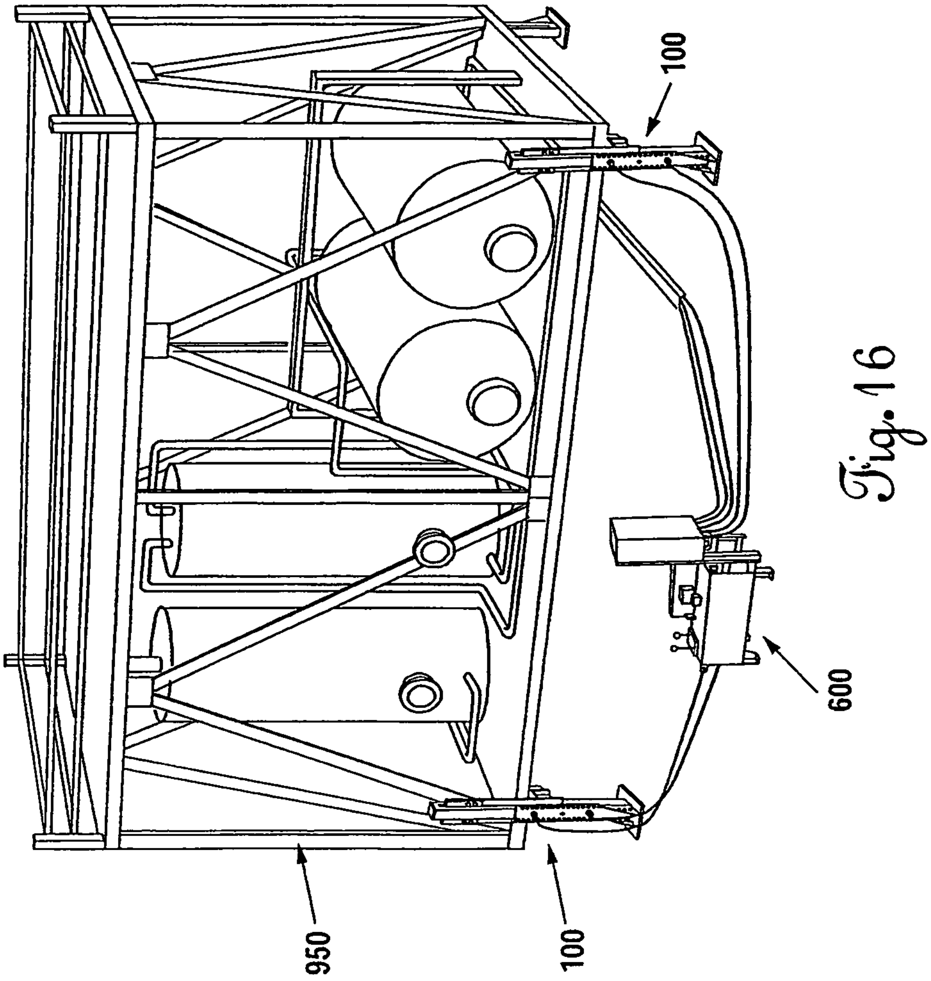
FIG. 16, is a view similar to that of FIG. 15, illustrating another type of transport device that might be used to move the object raised by the system of the invention.

Now, with reference to FIG. 16, there is shown a schematic of an ultra-large heavy weight chemical plant or refinery module 800 (FIG. 14) or refinery component 950. The system of the invention has been used to raise the facility 950 to position it such that a truck trailer bed 900 (FIG. 14) may be placed under it and the piston assembly lowered, slightly, to place the framework 801 of the facility 950 safely on to the truck trailer 900 pulled by the engaged truck 901.

Figure 15:
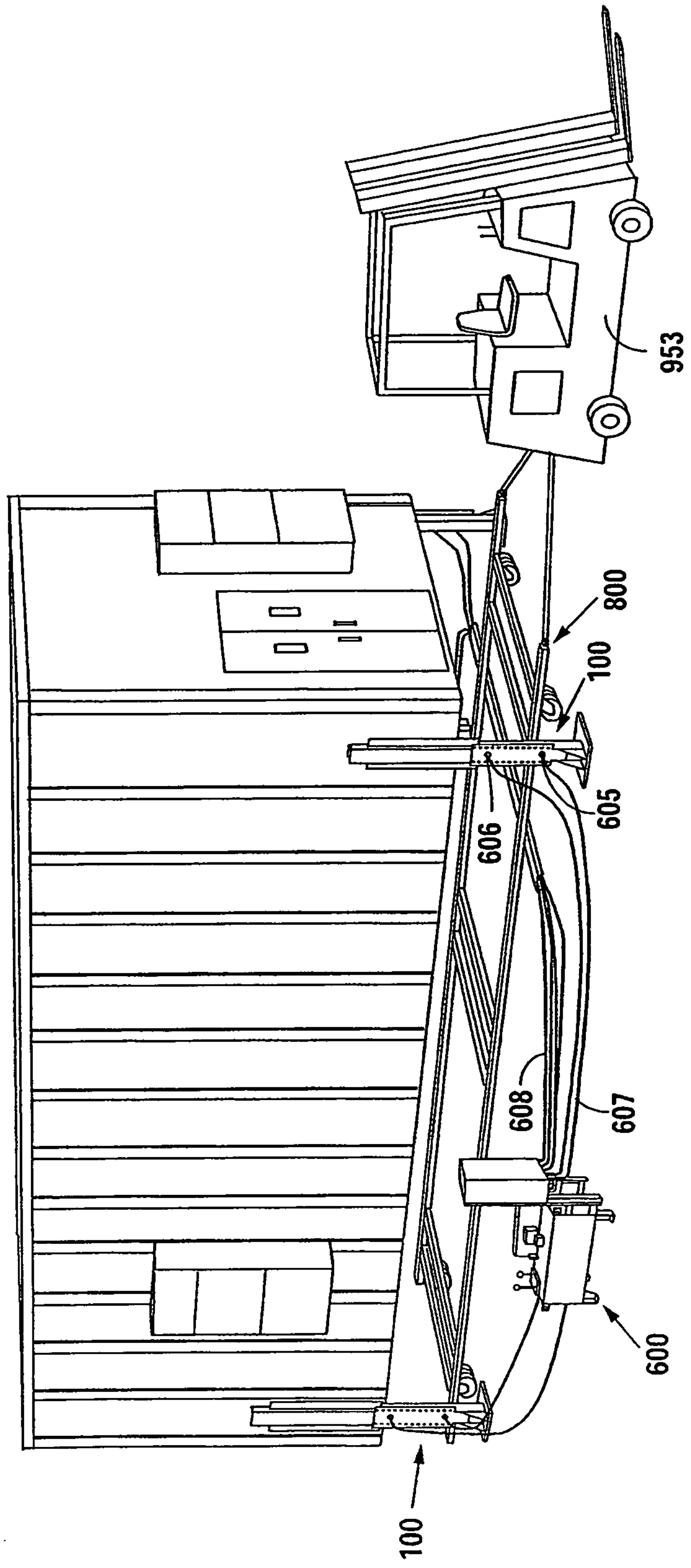
FIG. 15 is a view similar to that of FIG. 14, showing subsequent movement of a transport trailer being positioned under the raised object.

As schematically illustrated in FIG. 15, hydraulic conduits 604 have first respective ends 607, 608 sealingly and selectively secured to the control panel 600 and second end connections 605, 606 similarly connected to the chambers of each of the four piston cylinders 403. Of course, the purpose of the piston/cylinder components is to enable comparative telescopic movements between one another. In some cases, this invention contemplates arrangements such that the cylinder component actually selectively telescopes upwardly and downwardly relative to the piston member. In such an assembly, the hydraulic conduits 604 would be sealingly secured through one of the components for fluid communication into a fluid pressure chamber between or immediate the interior of the respective components.

Figure 13:
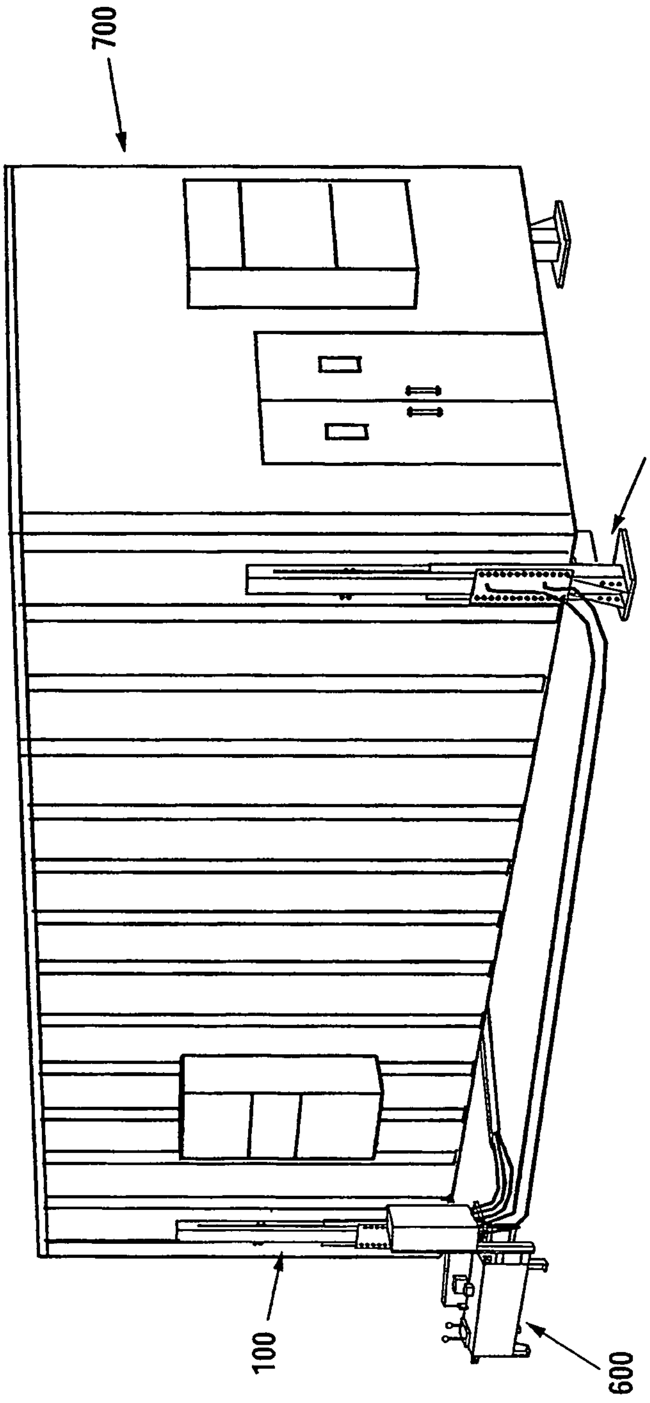
FIG. 13 is a view similar to that of FIG. 12, looking toward another side of the modular building.
Figure 17:
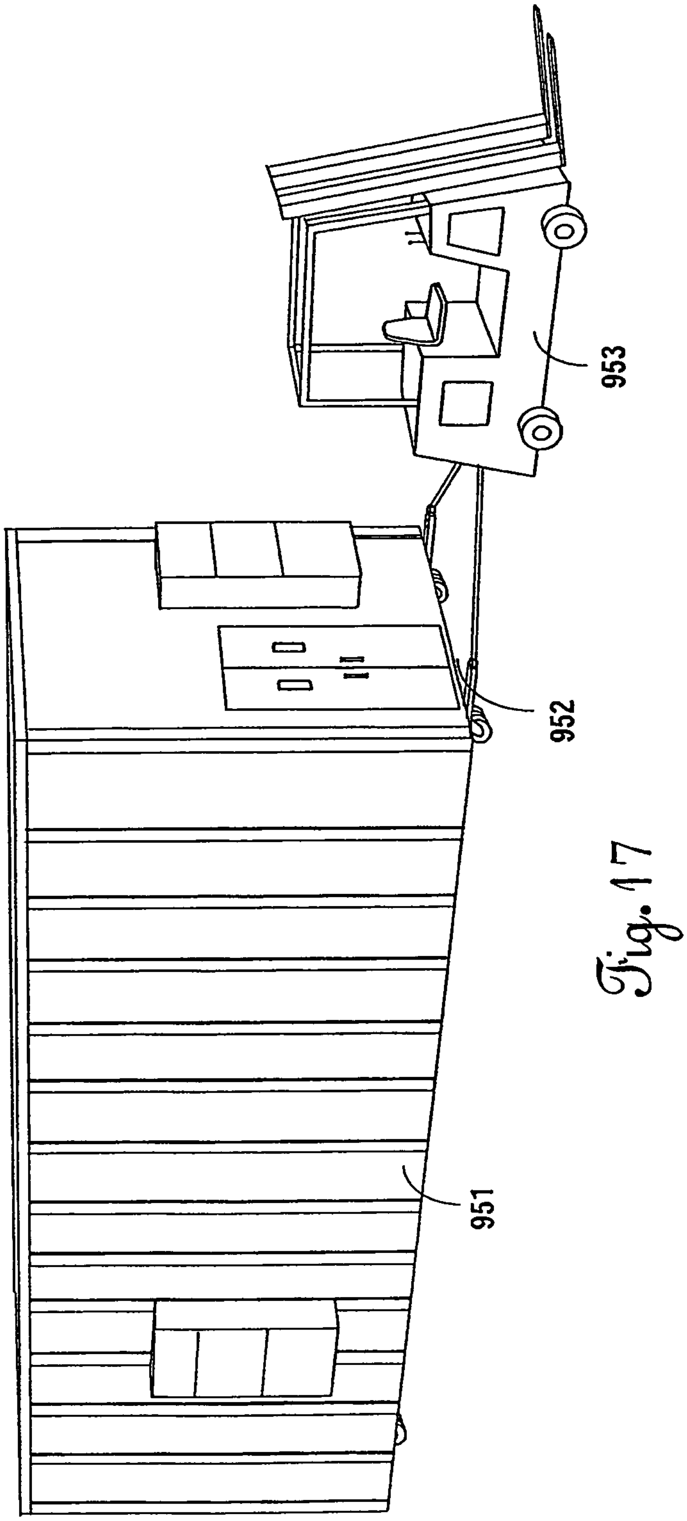
FIG. 17 is a view similar to that of FIG. 16, illustrating the object as actually lowered onto the transport frame and in tow to another location.

FIG. 17 schematically illustrates the object to be moved as a large modular building 951 which has been placed onto a moving wheeled frame 952 subsequent to use of the assembly of the present invention to raise same from a first position and location (FIG. 13) for subsequent movement to a second location. The frame 952 is connected to a fork lift truck 953 which tows the building 951 on the frame 952.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought is as set forth in the claims below.

What is claimed and desired to be secured by Letters Patent is:

1. A hydraulically actuated lifting system for completely raising a bulk sized, extremely high weight object from one position in close proximity to the ground to another, elevated position, said object having at least one lifting point in close proximity to the ground and from between about four to about eleven inches vertically relative to said ground, comprising:

(1) at least one cylindrical member;

(2) at least one housing including a slot on side walls;

(3) a normally retracted, selectively hydraulically telescopically extendable piston member within each said cylindrical member, said piston member having a distal end; and (4) lifting plate means having an upper face, said upper face having a vertical height relative to said ground of from between about four inches and about eleven inches, and said lifting plate means being responsive to telescopically extending movements of said respective piston member relative to said respective cylinder member, said lifting plate means having a carriage with an arm which extends through said slot inside of said at least one housing, and said lifting plate means being horizontally off-set from the respective distal end of said piston member, whereby, when said lifting system is positioned for completely lifting said high weight object, said respective upper face may be positioned in close proximity to the ground and under said high weight object at a lifting point, without positioning any of said respective piston members or respective cylinder members under said high weight object.

2. A hydraulically actuated lifting system for completely raising a bulk sized, extremely high weight object from one position in close proximity to the ground to another, elevated position, said object having at least one lifting point in close proximity to the ground, and from between about four to about eleven inches vertically relative to said ground comprising:

(1) at least one base;

(2) at least one housing including a slot on side walls;

(3) a cylindrical member disposed on each said at least one base;

(4) a normally retracted, selectively hydraulically telescopically extendable piston member within each said cylindrical member, said piston member having a distal end and a dorsal end; and (5) lifting plate means having an upper face, said upper face having a vertical height relative to said ground of from between about four inches and about eleven inches, and said lifting plate means being responsive to telescopically extending movements of said respective piston member, said lifting plate means having a carriage with an arm which extends through said slot inside of said at least one housing, and said lifting plate means being horizontally off-set from the respective piston member, whereby, when said lifting system is positioned for completely lifting said high weight object, said respective upper face may be positioned in close proximity to the ground and under said high weight object at a lifting point, without positioning any of said respective piston members under said high weight object.

3. A hydraulically actuated lifting system for completely raising a bulk sized, extremely high weight object from one position in close proximity to the ground to another, elevated position for subsequent transport of said object, said object having a plurality of lifting points in close proximity to the ground and from between about four to about eleven inches vertically relative to said ground, comprising:

(1) a plurality of bases;

(2) an elongated housing positioned on each said base, said housing including a slot on side walls;

(3) a cylindrical member disposed in each said housing;

(4) a normally retracted, selectively hydraulically telescopically extendable piston member within each of said cylindrical members, said piston member having a distal end and a dorsal end;

(5) a carriage assembly engaged to each said piston member at said outer end;

(6) an armature assembly vertically positioned on each said carriage assembly, and having distal and dorsal ends;

(7) lifting plate means having an upper face, said upper face having a vertical height relative to said ground of from between about four inches and about eleven inches, and said lifting plate means being secured to each armature assembly at the distal end thereof, said lifting plate means having said armature assembly extending through said slot inside of said housing, and horizontally off-set from the respective piston member, whereby, when said lifting system is positioned for completely lifting said high weight object, each of said upper faces may be positioned in close proximity to the ground and under said high weight object at said lifting points, without positioning any of said piston members under said high weight object.

4. The lifting system of claim 3, further comprising: hydraulic control means including: a source of hydraulic fluid; fluid pressuring means; pressure sensing means; hydraulic fluid lines having a first end in fluid communication with each of said cylindrical members and a second end in fluid communication with said source of hydraulic fluid.

* * * * *